July 5, 1927.  1,634,693
W. C. SLEEMAN ET AL
COUPLER RELEASE RIGGING
Filed Nov. 23, 1926
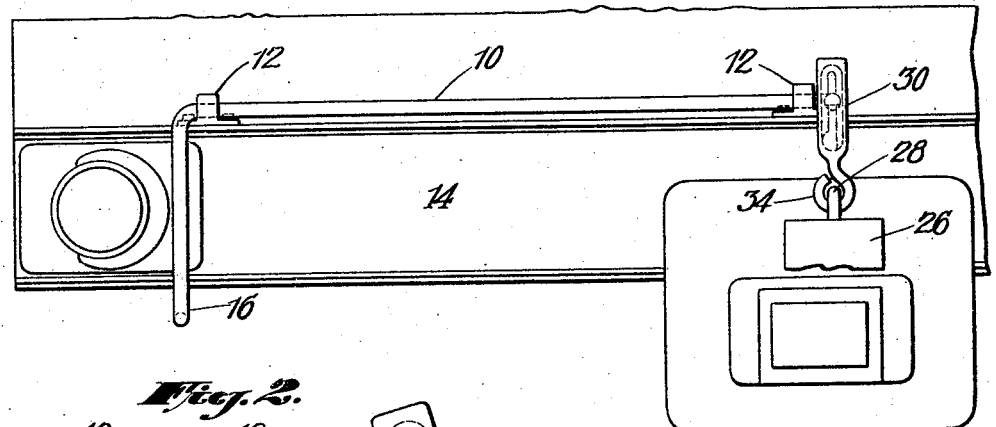
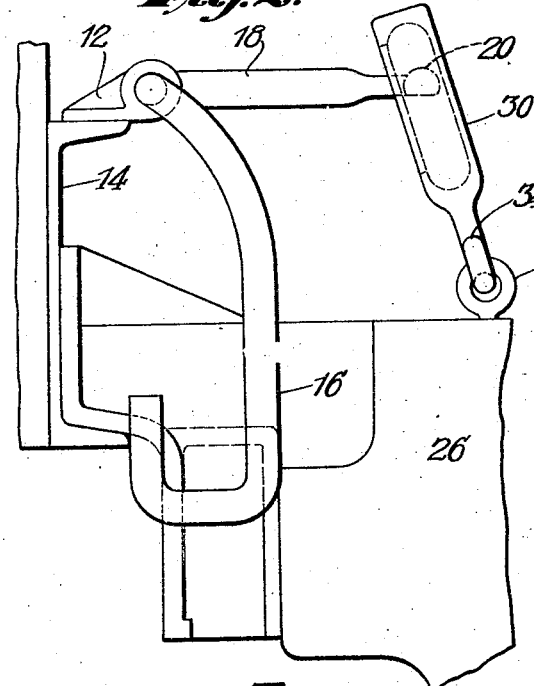
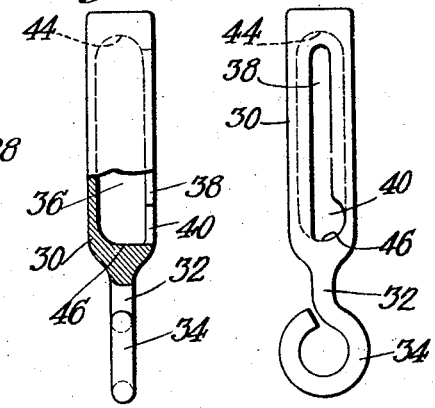
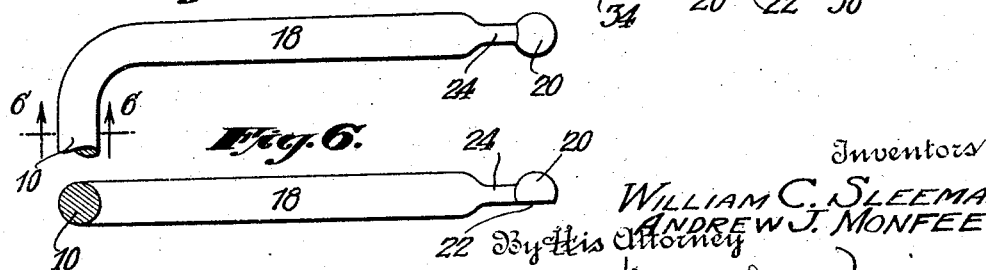
Inventors
WILLIAM C. SLEEMAN
ANDREW J. MONFEE
By His Attorney Patented July 5, 1927.

1,634,693

UNITED STATES PATENT OFFICE.

WILLIAM C. SLEEMAN, OF BIRMINGHAM, AND ANDREW J. MONFEE, OF PRATT CITY, ALABAMA.

COUPLER-RELEASE RIGGING.

Application filed November 23, 1926. Serial No. 150,251.

This invention relates to improved means for releasing the locking pin of a car coupler and aims to provide a mechanism designed to allow perfect freedom of the coupler in its normal movements and to permit free and unimpeded manipulation of the device during the operation of raising the locking pin. The construction includes a connecting link between the locking pin and the operating crank which permits universal relative movement between the various parts but eliminates all chance of parts of the rigging binding. Thus the coupler lock pin cannot be prevented from returning to its locked position by failure of the releasing mechanism.

The invention will be fully understood from the following specification when read in connection with the accompanying drawings and the novel features will be defined with particularity in the appended claims. In the drawings—

Fig. 1 is an end elevation of a portion of a railway car equipped with our improved release rigging;

Fig. 2 is a view in elevation from the left of Fig. 1;

Fig. 3 is a side view of a link of novel design for operatively connecting the locking pin with the operating crank arm;

Fig. 4 is another view of the link as seen from the right of Fig. 3;

Fig. 5 is a view in plan of the crank portion of the operating rod;

Fig. 6 is a section thereof on line 6—6 of Fig. 5;

Fig. 7 is a view illustrating the relative position to which the crank and link must be turned in order to engage or disengage the parts.

Referring in detail to the drawings, 10 represents a rod which is mounted to turn in suitable bearings 12—12 secured to the end sill 14 of a railway car. This rod at one extremity is bent as shown to form an operating handle 16. Approximately at the center of the car, the operating rod 10 is bent forwardly to form a crank arm 18 on the end of which is formed a ball-like portion 20 a part of which is flattened off as at 22 for a purpose which will hereinafter appear. In the embodiment of the invention illustrated, the diameter of the ball-like portion 20 is substantially the same as the diameter of the rod from which the crank arm is made and a neck 24 of smaller diameter is formed between the portion 20 and the main body of the crank 18.

The car coupler 26 is provided with the usual locking pin 28 having a suitable aperture therein. For transmitting movement of the crank arm 18 to the locking pin 28, I provide a link 30 such as illustrated in Figs. 3 and 4. One end of the link is formed with a shank 32 of substantially cylindrical form and this shank is bent around to form an eye 34 which loosely engages the aperture formed in the coupling pin 28 so as to permit relative movement in practically all directions. The upper portion of the link 30 is provided with an elongated socket 36. One face of the link is formed with a slot 38 which opens into the socket but which is narrower than said socket. One end of this slot is enlarged as indicated at 40. Normally, the crank 18 of the operating rod lies in a substantially horizontal position, the handle 16 being provided with an upturned portion 42 which engages the lower flange of the end sill 14. In this position the ball-like portion 20 of the crank 18 occupies an intermediate position between the ends 44 and 46 of the socket 36. The diameter of the neck portion 24 of the crank is such that it slides freely in the slot 38. Likewise, the ball 20 slides freely in the socket 36. Thus, the parts will not bind or interfere with the return movement of the locking pin. Because of the ball and socket coupling, it will be appreciated that universal relative movement between the parts is permitted. This will permit the coupler to swing from side to side in turning curves without binding the parts and will permit free movement due to weaving and jarring due to irregularities in the road bed.

To assemble the parts, the link and crank arm are turned to the relative positions illustrated in Fig. 7 wherein it is noted that the enlarged portion 40 of the slot 38 registers with the flattened portion 22 on the ball 20 thus the ball can be inserted. After this is done one of the parts is then turned substantially 90° or to the position shown in Fig. 1. In this position the parts are interlocked and they cannot be disconnected without turning to the position in Fig. 7. Hence, in normal operation it is clear that the parts cannot be jarred to such position that they will disconnect. The advantages of the construction will be readily appreciated by those skilled in the art.

Though we have described with great particularity the specific embodiment of the invention herein shown, it is not to be construed that we are limited thereto since various modifications and substitution of equivalents may be made by those skilled in the art without departing from the invention as defined in the appended claims.

What we claim is:

1. In combination with the locking pin of a car coupler, a releasing mechanism including a link having one end which engages the locking pin, and an operating rod having a crank arm with a ball-like portion formed at the end thereof, said link having an elongated socket formed therein for coaction with said ball-like portion of said link.

2. In combination with the locking pin of a car coupler, a releasing mechanism including an operating rod having a crank portion with a ball-like portion formed at the free end thereof, a link one part of which is operatively connected with said locking pin and the other part of which is formed with an elongated socket in which said ball-like portion is free to slide and swivel, said link having an elongated slot therein which opens into and is narrower than said socket, said crank being free to slide in said slot.

3. In combination with the locking pin of a car coupler, a releasing mechanism including an operating rod having a crank portion with a ball-like portion formed at the free end thereof, a link one part of which is operatively connected with said locking pin and the other part of which is formed with an elongated socket in which said ball-like portion is free to slide and swivel, said link having an elongated slot therein which opens into and is narrower than said socket, said crank being free to slide in said slot and one part of said slot being enlarged to permit the passage therethrough of said ball-like portion and said ball-like portion being flattened on one side so that the parts can be engaged or disengaged only when one of them is turned to a position contrary to their normal working position.

4. In combination with a locking pin of a car coupler, a releasing mechanism including an operating rod having a crank portion formed with an enlargement at the end thereof, a link connected with said locking pin having a socketed portion embracing the enlargement of said crank portion, said link having an elongated slot adapted to permit sliding movement of the link relatively to said crank portion.

5. In coupler release mechanism, an operating crank and a link connected with the coupler locking pin, said link and said crank being slidingly interconnected, one of the parts having a flattened ball-like enlargement, the other part having a socket portion embracing said enlargement, said parts being so arranged that they can be engaged or disengaged only when turned at an angle to their normal working position.

In witness whereof, we have hereunto signed our names.

WILLIAM C. SLEEMAN.
ANDREW J. MONFEE.